ROBERT B. LOMERSON
INVENTOR.

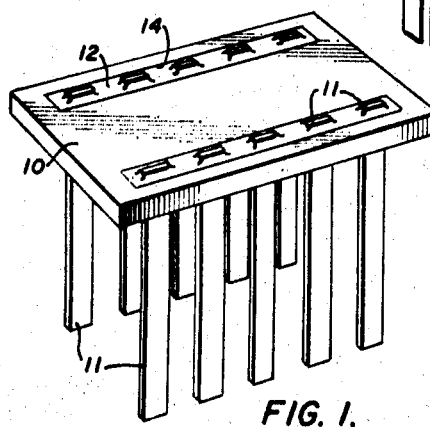
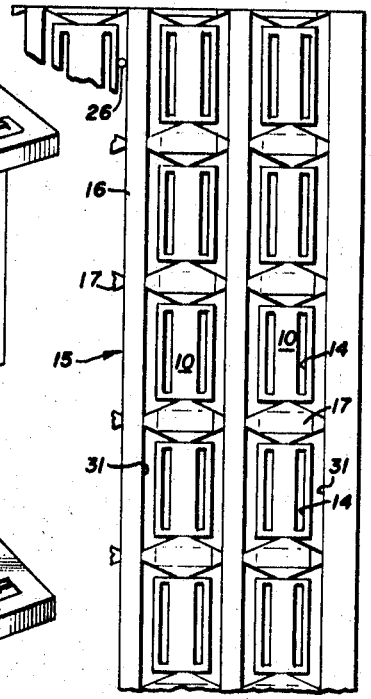
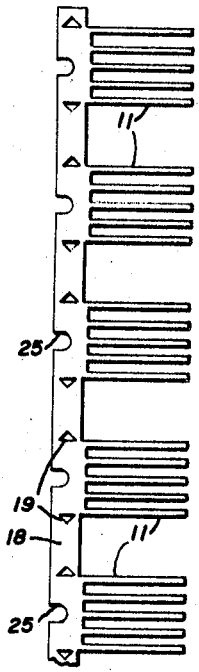
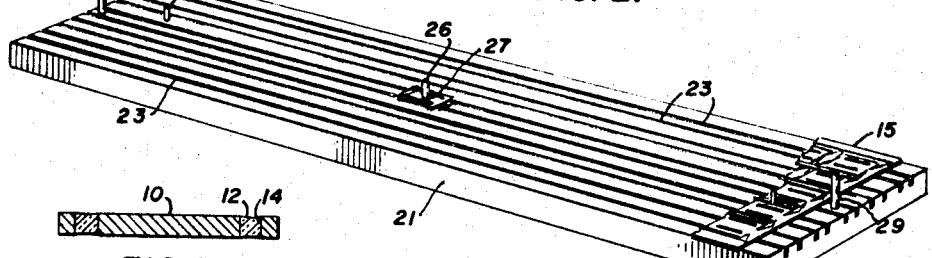
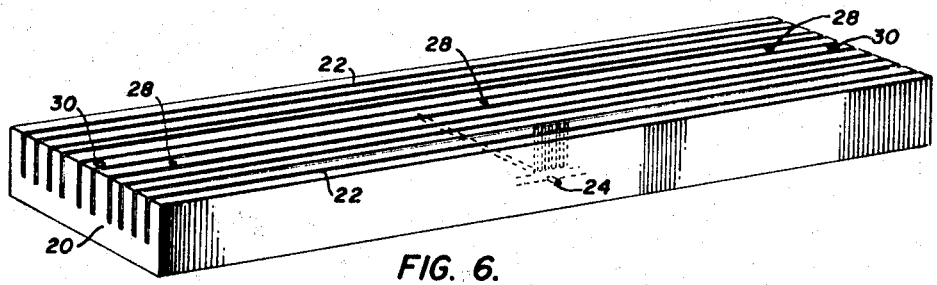
ROBERT B. LOMERSON
INVENTOR.
ATTORNEY

BY
ATTORNEY

ROBERT B. LOMERSON
INVENTOR.

BY

ATTORNEY

United States Patent Office 3,444,619
Patented May 20, 1969

3,444,619
METHOD OF ASSEMBLING LEADS IN AN APERTURED SUPPORT
Robert B. Lomerson, 108 S. Saginaw Blvd., Saginaw, Tex. 76079
Filed May 16, 1966, Ser. No. 558,172
Int. Cl. H01r 9/04, 9/16
U.S. Cl. 29—630                                6 Claims

ABSTRACT OF THE DISCLOSURE

A method of assembling multiple base elements having projecting electric leads wherein the base elements are initially supported in a flat matrix; glass or other meltable insulating material is received in holes in the bases, and wherein the leads are supported on a strip or strips and pressed through the glass while the latter is in a plastic stage. Subsequently the strip or strips are removed from the leads and the base elements from the matrix.

---

This invention relates to packages which may be used for sealing solid state devices and to a method for making the same. While the invention is intended, primarily, for packaging transistors, integrated circuits, semi-conductor diodes and the like, it may also be used for packaging other electrical devices which are hermetically sealed.

Integrated circuits have created a demand for small reliable enclosures in which solid state devices can be hermetically sealed. The very close tolerances necessary for such packages has, up to the present time, resulted in poor yields and high prices. Heretofore, flat packages of the described class were handled separately, required intricate and expensive jigging and it was difficult to establish reliable controls. Another problem was gold plating. The individual parts were plated by tumbling with the result that the plating varied in thickness and the extending fragile leads were subjected to bending with resulting fatigue. A further problem resided in final sealing. Stitch welding was time consuming and various types of soldering did not always make perfect seals.

The primary object of the invention is to provide economical packages for electrical devices and which packages may have either axial or peripheral leads.

A particular object is to mass produce packages of the described class in which the leads are accurately spaced and electrically isolated from the base elements.

Another object is to provide packages wherein the insulation of the leads may be visually inspected.

Another object is to provide means whereby multiples of assembled base elements and leads may be electrically tested for leaks or shorts.

A particular object of the invention is to provide a package for solid state devices which is rugged and durable in its use.

A further object is to provide a package capable of quick resistance welding which is simple and at the same time reliable.

These and other objects of the invention will become apparent from the following description and the accompanying drawings, wherein:

FIGURE 1 is a perspective view of a base element of a package according to the invention and showing the leads in place.

FIGURE 2 is a broken plan view of a matrix from which the base elements are derived.

FIGURE 3 is a broken plan view of a lead blank strip prior to upright insertion in a jig.

FIGURE 4 is a broken perspective view of a base element showing glass rods in parallel slots prior to melting the glass and inserting the leads.

FIGURE 5 is a transverse view of a base element and showing the glass after it has been melted.

FIGURE 6 is a perspective view of a jig for holding lead blank strips. A lateral locating pin and a portion of a lead blank strip are shown by means of dotted lines.

FIGURE 7 is a perspective view of a recessed jig for holding the matrix in alignment with the leads during assembly.

Figure 8:
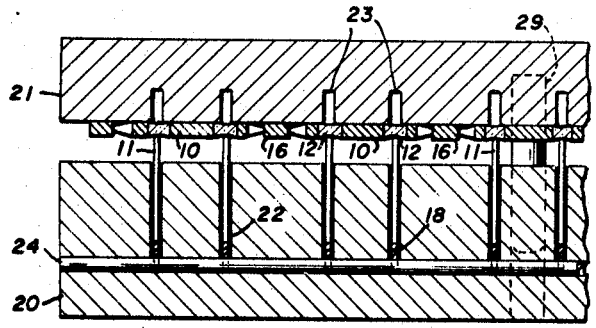
FIGURE 8 is a broken vertical sectional view of the jigs assembled and positioned to insert the leads in the molten glass.

A package according to the invention consists, primarily, of a base element 10, leads 11 extending through insulators 12 in the base element and a cap or cover 13. The insulators 12 of the first described form of the invention are glass rods received in parallel slots 14 in the base element 10 near the sides but between the ends thereof. The base elements 10 are initially parts of a matrix 15 of sheet metal which is ductile and a good conductor, for example, nickel-cobalt iron. Such alloy may be purchased under trademark Kovar. The pattern of the matrix is best shown in FIGURE 2 and consists of parallel portions 16 joined by diamond shaped portions 17, and the base elements 10 are joined at their opposite ends to intermediate points of the diamond shaped portions. All points of the diamond shaped portions 17 are tapered so that only frangible integral connection is made with the base elements 10 and the elongate portions 16.

Referring now to FIGURE 3, there is shown a lead blank strip 18 having groups of leads 11 projecting from one side. The strip 18 and leads 11 are of the same material as the matrix 15 and the length of each group of leads in such that it may be received in a slot 14 of a base element 10 without contact therewith. Also, the groups of leads 11 correspond with the lengths of the slots 14 while the base elements 10 are in the matrix 15. The strip 18 is divided for frangible connection along its length by perforations 19 having straight sides in alignment with the outer edges of each outer lead 11 of each group.

The jigs 20 and 21 illustrated in FIGURES 6 and 7 are for assembling multiples of the base elements 10 and leads 11. Both jigs 20 and 21 shown are rectangular and are of a refractory material not wetted by glass, for example, graphite, and both are longitudinally grooved, at 22 and 23, respectively, for receiving the lead strips 18. The lead strips 18 and adjacent portions of the leads 11 are closely received in the first grooves 22, whereas the extending ends of the leads may be loosely received in the second grooves 23. There is a transverse locating pin 24 in the first jig 20 across the bottoms of the grooves 22 for engaging notches 25 in the edge of the strip 18 opposite the leads 11. As shown, the pin 24 is at the longitudinal center of the jig 20 and each strip has a notch 25 opposite each group of leads 11 whereby strips 18 of different lengths may be inserted. On the opposing face of the second jig 21 there are three projecting locating pins 26 which closely engage locating holes 27 in the matrix 15 or, as shown in FIGURE 7, in the centers of three of the base elements 10, in which case the perforated base elements are not used for packages. The end locating holes, not shown, are elongate in a direction parallel with the grooves 23 to allow for expansion and contraction. There are matching holes 28 in the opposing face of the first jig 20 to receive the locating pins 26. Similarly, but outwardly of the ends of the matrix 15, there are projecting guide pins 29 on the second jig 21 which are slidably received in holes 30 in the first jig 20.

The method of assembling the base elements 10 and leads 11 is as follows:

First, a matrix 15 and the required number of lead strips 18, including their integral leads 11, are cleaned with a solvent such as trichloroethylene. Commercial solutions are available for this purpose. The matrix 15 and leads 11 are then oxidized by placing them in an oxidizing furnace. Multiples of matrices 15 and strips 18 may be oxidized at the same time. The time and temperature are somewhat critical but can be closely controlled, thus assuring the same amount of oxide on the matrix 15 and leads 11. The glass rods 12 are then placed in the solts 14 of the base elements 10, and because the diameters of the rods are a snug fit in the slots, they will not fall out when the matrix is lifted. In fact, the diameters of the rods 12 may be slightly oversize or the rods may be slightly undersize but in that case they are supported on a graphite block, not shown, which travels through the furnace. It is to be noted that the openings 31 between the parallel portions 16 of the matrix 15 and the sides of the base elements 10 are greater than the diameters of the rods 12. Thus, a matrix 15 may be placed in a box and an excessive number of rods 12 may be poured on the matrix. The box is then shaken from side to side and end to end, thereby causing the required number of rods to be received in the slots 14. See FIGURE 4. By tilting the matrix 15 the excess rods 12 will roll off. Within the scope of the invention other forms of insulators may be used. Instead of glass rods 12, preformed flat glass insulators, not shown, may be inserted in the slots 14 by suitable means, for example, by hand. Also, within the scope of the invention, other insulating media having the melting characteristics of glass may be used. After the glass rods 12 are in place in the slots 14, the matrix is then placed in a furnace or otherwise heated and the glass is melted so as to completely fill the slots. See FIG. 5. Preferably, a traveling furnace is used and the matrix 15 is on a flat non-combustible surface when traveling through the furnace with a flat weight on the matrix. After the matrix is removed from the furnace and cooled the insulation 12 is inspected to see if all of the glass is completely sealed around the slots 14. This can be done rapidly with a magnifying lens and a light source by passing the matrix 15 therebetween.

Figure 9:
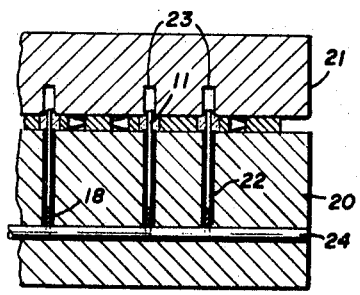
FIGURE 9 is a view similar to FIGURE 8 but showing the position of the jigs after the penetrating operation.
Figure 11:
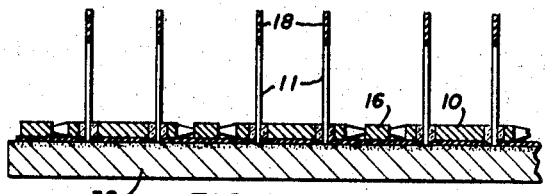
FIGURE 11 is a view similar to FIGURE 10, but showing multiple leads applied to the grinding surface.
Figure 10:
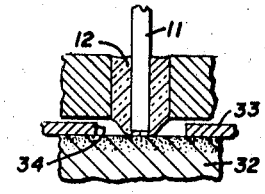
FIGURE 10 is a greatly enlarged broken vertical sectional view showing the glass applied to a flat grinding surface for exposing an inner end of a lead for subsequent electrical contact.
Figure 12:
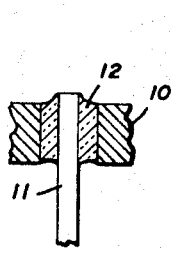
FIGURE 12 is a broken view of a lead and a sectional portion of the base element after removing the excess glass.

The strips 18 are then placed in the grooves 22 of the first jig 20, located by the pin 24 and notches 25, with the free ends of the leads 11 projecting above the jig. See FIGURE 8. The matrix 15, located by the pins 26, is then placed on the second jig 21 and the two jigs are horizontally assembled with the guide pins 29 in the guide pin receiving holes 30. In this position the free ends of the leads 11 are in contact with the glass insulators 12. The assembled jigs 20 and 21 are then placed in a furnace which has a temperature high enough to make the glass insulators plastic. The weight of the upper jig 21 causes the extending ends of the leads 11 to penetrate the glass 12, and by reason of the dimensions of the first grooves 22, the length of the leads 11 and the thickness of the base elements 10, the ends of the leads extend beyond the surfaces of the base elements 10 even though they may be covered with glass. See FIGURE 9. The melting of the glass 12 and penetration of the leads may be accomplished substantially at the same time. If this is to be done, the jigs are inverted prior to the first furnace treatment. Thus, the leads 11 are pressed down through the glass 12 as it melts. Upon cooling, the leads 11 are secure in the base elements 10 and have not yet been separated from the matrix 15 or the lead strips 18.

The excess glass 12 is removed by placing the glass covered ends of the leads 11 on a flat grinding surface 32 and moving the assembly under pressure. A spacer 33 of sheet material having holes 34 for receiving the projecting glass 12 may be placed between the matrix 12 and the grinding surface 32. The spacer 33, for example, may be of glazed ceramic material or a suitable metal. The oxide is then removed from the leads 11 and base elements 10 by cleaning the assembly in a solution of buffered muriatic acid, after which the parts are rinsed with water and dried.

Figure 13:
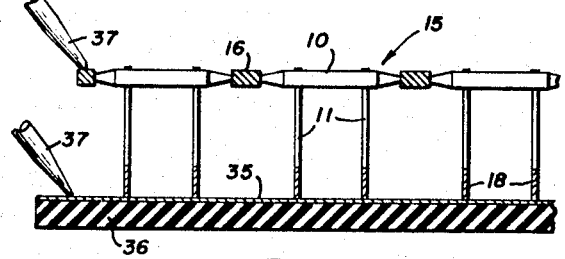
FIGURE 13 is a vertical sectional view of the matrix and assembled leads with the extending ends of the latter on a conductor sheet and showing electrodes applied to the matrix and conductor sheet for simultaneously testing multiple units.

Electrical testing for leaks is the next operation. See FIGURE 13. A sheet of metal foil 35 is placed on a flat resilient pad 36 and the assembly is placed on the foil with the lead strips in contact therewith. A circuit, including an ohm meter, is then applied to the matrix 15 and the foil 35. Only the electrodes 37 of the circuit are shown. If there are any leaks or shorts the same will register on the ohm meter. If there is evidence of a leak or short the same is located visually by a light and lens as referred to in the foregoing and the faulty base element 10 and sealed leads 11 are marked and subsequently destroyed.

After cleaning and inspecting, the assembly is plated as a whole or the units may be separated for plating, that is, the lead strips 18, the parallel portions 16 of the matrix 15 and the diamond shaped portion are removed, for example, by shearing. Preferably, the plating is done while the base elements 10 are still in the matrix 15 with the leads 11 in place. Plating may be by electrolysis or immersion. Gold, in most cases, is preferred as a plating metal, but other metals such as aluminum may be applied on the post ends for prevention of purple plague.

Figure 14:
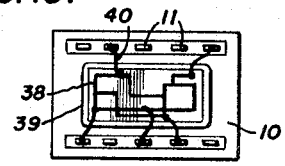
FIGURE 14 is a plan view of an assembled base and showing the leads connected with an integrated circuit.

Although not a part of the present invention, a miniature circuit is shown in FIGURE 14 and is applied to the present construction. Here a printed, etched or otherwise conventionally made circuit 38 on a silicon chip 39 is mounted on the base element 10 by means of a suitable adhesive such as solder and the leads 40 of the circuit are metalurgically bonded to the leads 11 of the package. A metal package cover 13 having a flange 41 therearound is then welded, by resistance welding around the surface of the base element 10, but may be soldered in place if so desired.

Figure 15:
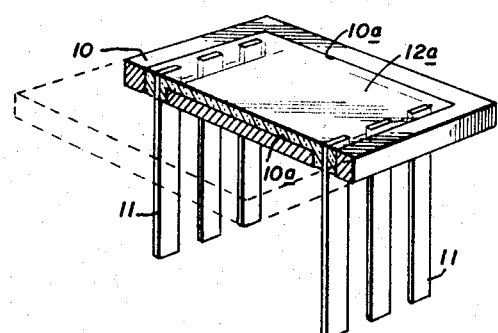
FIGURE 15 is a perspective view shown in transverse section of a modified form of the invention.
Figure 16:
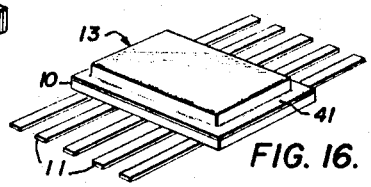
FIGURE 16 is a perspective view of a package with the cover welded in place and showing the leads bent outwardly so as to provide what is herein referred to as a peripheral package.

The form of the invention illustrated in FIGURE 15 is like the foregoing except that area of the base element 10 on its upper surface between the slots 14 is recessed to form a cavity 10a, as by etching, and a close fitting piece of glass 12a is inserted so as to provide an area for disposition of a metal circuit. The bottom surface and side walls of the cavity 10a are oxidized in accordance with the foregoing before glass 12a is placed therein. Otherwise the method and construction are the same as described in connection with the first form of the invention.

The forms of the invention illustrated in FIGURES 17 through 22 are assembled in accordance with the foregoing except for minor variations hereinafter pointed out.

Figure 17:
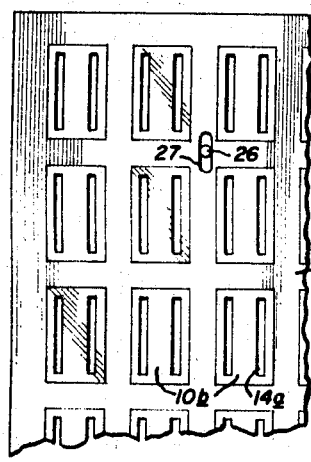
FIGURE 17 is a broken plan view of a matrix holding base elements of dissimilar material.
Figure 20:
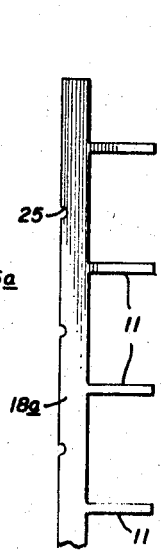
FIGURES 20 and 21 are broken plan views of lead blank strips and showing an arrangement of leads to be received in the holes of the circular base elements while supported in the matrix.

The matrix 15a of FIGURE 17 is a single rectangular sheet of material which does not necessarily have to be oxidized and has longitudinal parallel rows of rectangular openings 42 for receiving base elements 10b of dissimilar material, for example, ceramic in which the parallel slots 14a have been preformed. The material of the matrix 15a is the same as the lead strips 18. The same insulation 12, not shown in FIGURE 17, is used and the oxidized lead strips 18, FIGURE 3, are inserted and treated in the manner described. As before, the matrix 15a is provided with means for accommodating expansion and contraction, but only one pin 26 and locating hole 27 are shown.

Figure 18:
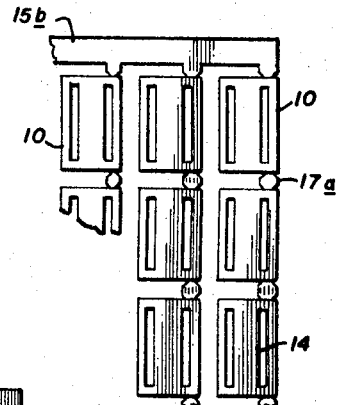
FIGURE 18 is a broken plan view of a modified form of matrix and a different integral connection with the base elements.
Figure 21:
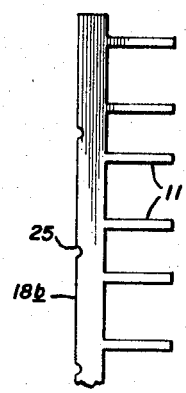
Figure 19:
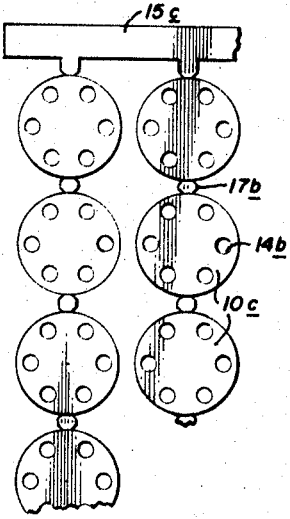
FIGURE 19 is a broken plan view of a matrix supporting integral circular base elements.
Figure 22:
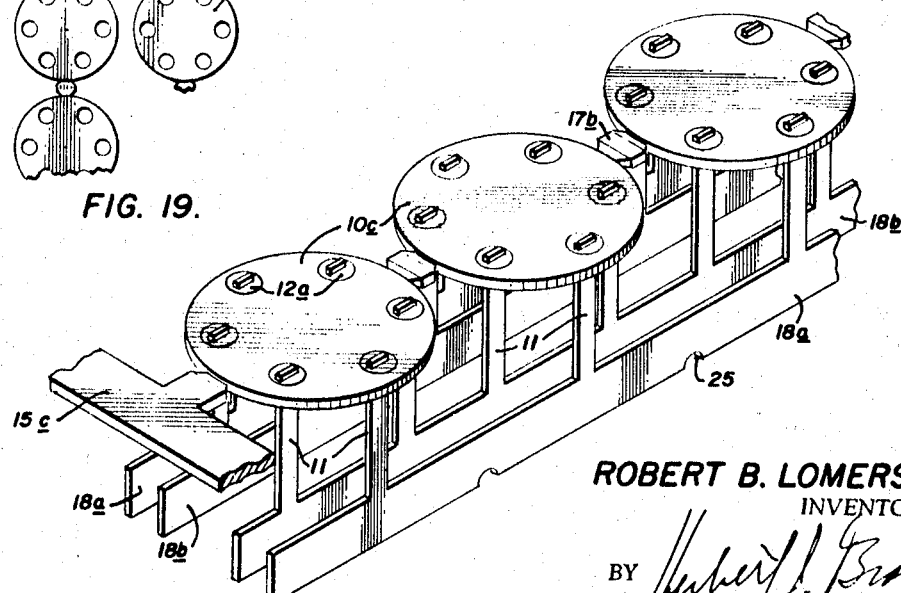
FIGURE 22 is an enlarged perspective view of the assembled circular base elements and leads prior to removal from the matrix and lead blank strips.

The matrix 15b illustrated in FIGURE 18, like that of FIGURE 2, is of the same material as the base elements 10, but instead of being joined to the matrix by diamond shaped portions 17 they are connected to each other at their ends by small integral frangible portions 17a without the use of the parallel connecting strips 16. The leads 11 and matrices 10 are assembled in the same manner as described in connection with FIGURES 2 and 17.

The form of the invention illustrated in FIGURES 19 through 22 resembles those described in FIGURES 2 and 18, except the base elements 10c are round. The matrix 15c is like the matrix 15b of FIGURE 18 and the rows of circular base elements 10c are connected by frangible integral portions 17b. The openings 14 are arranged in a circle about the center of each base element 10 and the corresponding openings of each base element 10c are in longitudinal alignment with each other. Thus, it is possible to assemble multiple base elements 10c by varying the spacing of leads 11 on strips 18a and 18b. The edges of the strips 18a and 18b, as before, are notched for locating the leads in jigs such as 20 and 21. The glass insulators 12a, FIGURE 22, may initially be beads, preformed discs or other insulating media having the melting characteristics of glass.

The invention is not limited to the methods and constructions herein shown and described, but may be varied within the scope of the appended claims.

What is claimed is:

1. The method of assembling multiple base elements and leads for solid state packages or the like wherein a matrix supports at least one longitudinal row of base elements having openings therethrough and wherein corresponding openings in the base elements are in longitudinal alignment with each other and wherein said leads project from one side of elongate strips, each said opening being of a size to receive at least one of said leads without contact with the opening, the steps of placing glass in said holes and melting the same in place, cooling said glass and said base elements while in the matrix and inspetcing the glass for porosity, heating the glass to a plastic stage and pressing the extending ends of said leads through said glass to a distance slightly beyond the opposite surfaces of said base elements, cooling said glass, matrix and leads, grinding said extending ends of said leads, removing said elongate strips from the remaining ends of said leads and subsequently removing said base elements from said matrix.

2. The method of assembling multiple base elements and leads for solid state packages or the like wherein a matrix supports at least one longitudinal row of base elements having openings therethrough and wherein corresponding openings in the base elements are in longitudinal alignment with each other and wherein said leads project from one side of elongate strips, each said opening being of a size to receive at least one of said leads without contact with the opening, the steps of placing glass in said holes and melting the same in place, pressing the extending ends of said leads through said glass while in a plastic stage to a distance slightly beyond the opposite surfaces of said base elements, cooling said glass, matrix and leads, and grinding said extending ends of said leads and removing said elongate strips from the remaining ends of said leads.

3. The method defined in claim 2 and including the steps of oxidizing at least the wall surfaces of said holes and at least the extending end portions of said leads.

4. The method defined in claim 2 and including the step of electrically testing for leaks after said second cooling step, of placing said strip on a planar conductor and applying a testing circuit to said conductor and said matrix.

5. The method defined in claim 2 and wherein said openings are elongate slots parallel with the length of said row of base elements and wherein said step of placing glass in said holes comprising placing an excess of glass rods on said matrix and said base elements, said rods being of a size to be received in said slots, shifting said matrix and base elements horizontally in at least two directions thus causing said rods to fill said slots, and removing the excess glass rods.

6. The method of assembling multiple base elements having openings therein and leads projecting through said openings, the steps of longitudinally aligning at least one row of said base elements and arranging corresponding said openings in lines parallel with the length of the row of said base elements, depositing glass in said openings, melting said glass in said openings, cooling said glass, arranging said leads in rows above said glass containing openings, remelting said glass and pressing the ends of said leads into said glass while the latter is in a molten state.

References Cited

UNITED STATES PATENTS

| 2,899,659 | 8/1959 | McIlvaine | 29—155.5 |
| 3,300,832 | 1/1967 | Cave | 29—583 X |
| 3,051,826 | 8/1962 | Avila. | |
| 3,109,225 | 11/1963 | Wright et al. | 29—583 |
| 3,317,983 | 5/1967 | De Wit et al. | |

JOHN F. CAMPBELL, *Primary Examiner.*

ROBERT W. CHURCH, *Assistant Examiner.*

U.S. Cl. X.R.

29—629, 470, 472.9; 65—59; 174—52; 206—56